United States Patent Office 3,378,424
Patented Apr. 16, 1968

3,378,424
LAMINATION OF FIBROUS SUBSTRATES
Webster M. Sawyer, Jr., Orinda, Calif., assignor to Shell Oil Company, New York, N.Y., a corporation of Delaware
No Drawing. Filed Nov. 2, 1964, Ser. No. 408,379
5 Claims. (Cl. 156—332)

ABSTRACT OF THE DISCLOSURE

An improved method of adhering polymeric films to fibrous substrates by (1) treating at least one surface of the substrate with an aqueous emulsion, the dispersed phase of which is a mixture of petroleum wax and a copolymer of ethylene and a $C_{3-5}$ comonomer, the comonomer being an α-olefin, an ester of terminally ethylenically unsaturaed carboxylic acids and saturated aliphatic alcohols or an ester of saturated monocarboxylic acids and terminally ethylenically unsaturated aliphatic alcohols, (2) removing the emulsion water from the treated substrate, and (3) laminating a polymeric film to the thus-treated substrate surface at a temperature at least approximately as high as the softening point of the polymeric film. Useful substrates are paper and carton boards especially for use in wrapping and containing dairy products and other food products.

---

This invention relates to the application of polymeric coatings to fibrous substrates. More particularly, it relates to an improved method of improving the adhesion of polymeric films or coatings to fibrous substrates and to laminations made thereby.

Petroluem-derived waxes have been used for many years to coat paper and carton boards especially for use in wrapping and containing dairy products and other food, products such as bakery goods as well as for coating cloth, fibers, and food products including cheese and meats to render them moisture-vapor resistant. Such waxes, however, have an unfortunate tendency to crack and peel off the coated articles, especially when they are subjected to repeated flexing or severe creasing. Even waxes modified with polyethylene, while having some improved properties, show advantages relative to brittleness and lack of tensile strength particularly under low-temperature conditions.

In the last few years, the disadvantages which are normally attendant to the use of wax in coating applications have resulted in the significant supplanting in some applications of wax alone by the use of polymeric coatings, polyethylene in particular and, more recently, polypropylene. In addition, polymeric wax reinforcing agents such as copolymers of ethylene and vinyl acetate in concentrations on the order of 20 to 30%, basis wax, have also been used to some extent in attempting to overcome the inadequacies of conventional petroleum waxes. Furthermore, copolymers of ethylene with $C_{3-8}$ olefins have been found to have quite excellent wax-reinforcing properties.

A major shortcoming which has accompanied the use of polymeric films, particularly non-polar polymeric films, to coat fibrous materials has been the difficulty of obtaining adequate adhesion. This is attributable (1) to a lack of sufficient penetration and wetting of the substrate and (2) to the fact that no significant chemical bonding occurs between the substrate and the hydrocarbon film. As to (1), theoretical analysis of the factors affecting penetration and wetting indicates that the limiting factor as to penetration of polymeric materials is their high viscosity at practicable application temperatures.

As to (2), it is, of course, technologically feasible to modify the chemical nature of either or both the substrate and the film to be applied thereto. For example, it has been shown that the introduction of —COOH groups into vinyl copolymer increases its adhesion to cellulose. It has also been shown that oxidative degradation of polyethylene improves its adhesion to fibrous substrates. However, such means are frequently expensive and/or degrade the character of the laminated film to a harmful degree.

Still another method of overcoming such adhesive difficulties is to employ a material which has the properties of good adhesion to both the substrate and the laminating substance as a "tie coat," thus eliminating the necessity for direct chemical or physical modification of either the substrate or the laminating film substance.

Accordingly, applicants have devised an improved method for improving the adhesion of polymeric films to fibrous substrates, which method comprises (1) treating at least one surface of the fibrous substrate with an aqueous emulsion, the dispersed phase of which is a "homogeneous" mixture of petroleum wax and a copolymer of ethylene and a $C_{3-5}$ comonomer selected from the group consisting of alpha-olefins, esters of terminally ethylenically unsaturated carboxylic acids and saturated aliphatic alcohols and esters of saturated monocarboxylic acids and terminally ethylenically unsaturated aliphatic alcohols, (2) removing the emulsion water from the treated substrate, and (3) applying a polymeric film to the thus-treated substrate surface at a temperature at least approximately as high as the softening point of the polymeric film.

The wax-polymer emulsion used for the treatment of the substrate comprises petroleum wax and copolymers of ethylene with at least one $C_{3-5}$ comonomer. The emulsion therefore consists essentially of a continuous phase of water, and a discontinuous (dispersed) phase of wax-polymer particles, the surfaces of which have adsorbed thereon a surfactant compound.

The polymers which can be used in accordance with the invention can be characterized in a general way as long-chain hydrocarbon backbones which are randomly and irregularly substituted with side chains which are no more than about three atoms in length. More specifically, the polymers are copolymers of ethylene with terminally ethylenically unsaturated organic compounds containing 3–5 carbon atoms. The preferred comonomers are selected from the group consisting of alpha-olefins, esters of terminally ethylenically unsaturated monocarboxylic acids and saturated aliphatic alcohols and esters of saturated monocarboxylic acids and terminally ethylenically unsaturated aliphatic alcohols. Examples of such comonomers are unsaturated esters such as vinyl acetate, ethyl acrylate and methyl acrylate and normal lower alpha-olefins such as propylene, butene-1 and pentene-1.

The ethylene-vinyl acetate copolymers which are to be used in the compositions of the invention correspond to the general formula

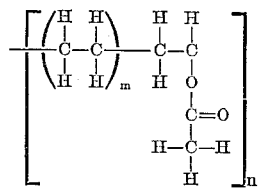

wherein $n$ ranges from about 15 to about 250. The actual occurrence of the acetate substituents along the hydrocarbon chain is of a random character and thus the letter "$m$" denotes the average number of ethylene units per vinyl acetate unit in the molecule rather than the presence of regularly recurrent units having the composition given within the above brackets. Typical properties of ethylene-vinyl acetate copolymer which may be used in the invention are as follows:

TABLE I.—PROPERTIES OF ETHYLENE-VINYL ACETATE COPOLYMERS

|  | A | B | C | D | E | F | G | H | I | J |
|---|---|---|---|---|---|---|---|---|---|---|
| Wt. percent Vinyl Acetate | 33 | 27-29 | 28 | 28 | 28 | 28 | 23 | 23 | 18 | 18 |
| $C_2$=/Vinyl Acetate Mole Ratio | 6.5/1 |  | 8/1 | 8/1 | 8/1 | 8/1 | 10/1 | 10/1 | 14/1 | 14/1 |
| Melt Index, g. 10 min | 25 | 125-175 | 100 | 15 | 25 | 15 | 400 | 100 | 2 | 150 |
| Molecular Weight | 28,000 |  |  |  | 28,000 | 33,000 |  |  |  |  |
| Softening Point (R and B), °F | 243 | 192 |  | 252 | 255 | 276 |  |  |  |  |
| Tensile Strength, p.s.i | 1,000 | 460 |  | 1,700 | 1,000 | 2,000 |  |  |  |  |
| Elongation at Break, percent | 700 | 650 |  | 800 | 700 | 750 |  |  |  |  |
| Density | 0.95 | 0.95 |  |  | 0.95 | 0.95 |  |  |  |  |

The ethylene–alpha-olefin copolymers which may also be used in accordance with the invention have the general linear configuration $$-(CH_2)_n-\underset{R}{\overset{H}{C}}-$$

wherein $n$ is an average integer between about 10 and about 50 (preferably 10–40), R is a hydrocarbyl radical having 1–3 carbon atoms and the unit $(CH_2)_n$ is an unbranched hydrocarbon chain, the average molecular weight of the copolymers being between about 20,000 and 800,000 (preferably 200,000–400,000). Expressed as intrinsic viscosity, copolymers having intrinsic viscosities of between about 1.0 and 3.0 are preferred.

The density of the copolymers may be varied over a considerable range, usually between about 0.85 to about 1.0, low density copolymers being regarded as those having densities in the order of 0.85 to about 0.91 and high density materials being regarded as those having densities from the latter upper limit to about 1.0. Advantages are gained by the combination of several different degrees of high and low density and/or high and low molecular weight insofar as increase in low-temperature properties without a corresponding increase in brittleness being experienced.

The mole ratio of ethylene to higher alkene in the copolymer can be varied from as low as about 60% to as high as about 95% (molar basis). However, more highly crystalline copolymers, i.e., those having from 80 to 95% ethylene are preferred in order to avoid excessive tackiness.

Typical properties of ethylene-propylene copolymer as well as some other unsaturated ester copolymers are as follows:

TABLE II.—PROPERTIES OF OTHER ETHYLENE COPOLYMERS

|  | Ethylene/Ethyl Acrylate Copolymers | | Ethylene/Methyl Acrylate Copolymers | | Ethylene/Propylene Copolymer |
|---|---|---|---|---|---|
| Sample | K | L | M | N | O |
| Wt. Percent Comonomer | 20 | 30 | 17.4 | 23.6 | 18 |
| Melt Index, g./10 min | 18 | 18 | 3.5 | 6.6 | (¹)15 |
| Molecular Weight | 32,000 |  | 41,000 | 38,000 | 200,000 |
| Tensile Strength, p.s.i | 1,200 | 750 | 1,180 | 1,200 | 3,500 |
| Elongation at break, percent | 700 | 800 | 710 | 763 | 570 |
| Density | 0.927 | 0.932 | 0.942 | 0.947 |  |

¹ Measured in 30% concentration with 180° F. M.P. residual paraffinic wax.

The waxes which may be modified with the subject copolymers are petroleum waxes referred to in the art as paraffin wax or as microcrystalline wax. Microcrystalline wax is also known as amorphous wax and is obtained by the dewaxing of residual lubricating oils while the paraffin waxes are usually obtained by the dewaxing or distillate lubricating oil fractions. Distillate paraffin waxes usually have melting points between about 120° F. and about 145° F., preferably between about 125 and 140° F. Microcrystalline waxes which contain only minor amounts of normal paraffins and largely predominate in highly branched and naphthenic waxes have melting points in the order of 130–160° F., usually between 140 and 150° F.

The higher melting point paraffin waxes are especially useful in many coating wax applications. Heavy distillate waxes obtained from the highest boiling distillate lubricating oil fractions by dewaxing have melting points in the order of 145 and 185° F., as does the high melting point paraffin wax split from microcrystalline wax by fractional crystallization.

Special waxes may be obtained in particular instances, such as the plastic wax obtained by the deoiling of soft wax fractions which normally are separated from paraffin waxes during deoiling and dewaxing procedures. These plastic waxes are useful for their extreme flexibility and, while useful for this particular property, are especially subject to being fortified with respect to blocking and tensile strength as well as toughness by incorporation with the subject copolymers.

It is normal experience in designing wax compositions to find it necessary to combine several waxes together in a single composition. The purpose of this, of course, is to obtain the beneficial properties inherent in each particular type of wax or to minimize adverse properties of other waxes so included.

The disperse phase of the emulsion comprises at least 1% by weight copolymer and preferably more, e.g. 5–60% of the coplymer and 40–95% by weight wax. Such compositions containing from 65–85% wax and 35–15% copolymer have been found to have especially good properties and are therefore preferred.

The methods of compounding the wax and polymer for use in the preparation of emulsions, though not critical per se, is nevertheless important and must be performed with a view toward complete homogeneity of the wax and the polymer.

Probably the simplest method is by heating and stirring the several components until a single phase melt is obtained.

Another method of compounding the wax-polymer compositions may be referred to as "mill mixing." In this method, the coplymer is heated on a compounding roll or a set of rolls and the wax is added while the copolymer is being rolled. The temperature is gradually lowered to obtain an essentially solid composition when the temperature is sufficiently reduced. An improvement on this comprises the so-called "extrusion mixing" of compositions prepared by any of the above methods whereby the composition is subjected to extrusion pressures which cause greater intermixing than can be obtained by the method just described.

Another method of dispersing the copolymer in wax, a preferred method, in fact, comprises forming a solution of the coplymer in a relatively volatile solvent, such as cyclohexane, benzene (or a chlorinated hydrocarbon solvent) and adding molten wax or a solution of wax thereto. This method produces homogeneous compositions easily and does not subject the components to the adverse effect of prolonged high temperature. Another preferred procedure is to dissolve the wax into the polymer reaction solution as described hereinbefore. As used herein, the term "relatively volatile solvent" refers to a normally liquid organic solvent having a boiling point no higher than about 110° C., and preferably no higher than about 100° C.

However, regardless of the particular mixing scheme used, for best results the wax and copolymer must be in a completely homogeneous state. That is to say, both the wax-polymer mixture and the subsequently prepared emulsion must not contain discrete particles of either wax or polymer. Moreover, as will be evident from the discussion following, the preparation of aqueous emulsions therefrom is conducted in a manner so as to avoid any change in the homogeneity of the wax-polymer mixture.

The emulsions are stabilized by any one of the three basic types of emulsion stabilizers (emulsifiers), viz anionic, cationic or nonionic. However, regardless of which type is used it is important that the hydrophile-lipophile balance (HLB) be such that the emulsifier is at least moderately hydrophilic and preferably strongly hydrophilic. More particularly, it is necessary that the emulsifier have an HLB number of 8 to 30 and preferably at least 10. In using the concept of HLB numbers above, reference is made to the work of W. C. Griffin reported in J. Soc. Cosmetic Chemists, 1, 311 (1949). However, in addition to the experimental procedures outlined there, additional reference is made to less complicated procedures for estimating HLB numbers such as those reported by Griffin in J. Soc. Cosmetic Chemists, 5, 249 (1954), and Offic. Dig. Federation Paint and Varnish Production Clubs, 28, 466 (1956). Examples of suitable emulsifiers having an HLB number of at least 8 are listed below. The letter following each denotes the type of emulsifier (N=nonionic; C=cationic; A=anionic):

Polypoxypropylene stearate (N)
Sorbitan monolaurate (N)
Hexaethylene glycol monostearate (N)
Polyoxyethylene monooleate (N)
Polyoxyethylene allyl phenol (N)
Polyoxyethylene sorbitan monolaurate (N)
Potassium oleate (A)
Sodium lauryl sulfate (A)
N-cetyl N-ethyl morpholinium ethosulfate (C)
Stearyl diethylethanol amine (C)
Sodium stearate (A)
Oleyl triethanol amine (C)

The concentration of emulsion stabilizer which is required varies rather widely and depends entirely upon the particular emulsifier which is used. However, in order to prevent reduction in the strength of the films laid down from such emulsions, it has been found necessary to employ emulsification stabilizer having a critical micelle concentration (C.M.C) of not more than about 5.0% by weight based on the water. Consequently, it is preferred that the amount of emulsifier remaining in the continuous phase upon formation of the emulsion be no greater than about the C.M.C. of the emulsifier, and in no event greater than 5.0% by weight based on the water. As little as 0.01% by weight of the emulsifier can be used to stabilize the emulsions of the invention; however, it is preferred to use at least 0.5%. Still better results are obtained with most emulsion stabilization agents if at least 1% is used. It will, of course, be recognized that the total amount of emulsifier in the disperse and continuous phase will be a function of the number and size of the dispersed particles and the cross-sectional area of the adsorbed (lipophilic) portion of the emulsion stabilizer.

The processing scheme which is preferably followed in order to obtain suitable wax-copolymer emulsions comprises four steps, which will be discussed in the order of their sequence: (1) Preparation of separate liquid phases; (2) emulsification of the liquid phases; (3) solvent removal; and (4) concentration of the emulsions.

PREPARATION OF SEPARATE LIQUID PHASES

In order to obtain adequate dispersion and emulsion stability, it is necessary that the wax-copolymer be dispersed initially in a liquid phase. To do this, the wax and polymer either together or separately must be dissolved in a mutual solvent. Especially suitable for this purpose are $C_6$ solvents such as cyclohexane, benzene, and n-hexane. In order to facilitate solution of the wax and polymer as well as to reduce the viscosity of the solution, it will generally be preferred to heat the solution. In this regard, it is essential that the polymer, regardless of its molecular weight, be truly dissolved in the solvent. Mere dispersion of the highly swollen polymer in the form of, say, slimy gelatinous masses is not adequate. The amount of solvent is not particularly critical except insofar as the resultant solution (cement) containing at least 1% wax-polymer must be readily pumpable within the temperature range of from about 50–80° C.

To the water, which will form the continuous phase of the emulsion, is added the emulsifier. Because of its relatively high HLB number, it is readily soluble in the water and no particular mixing problems are involved.

EMULSIFICATION OF THE TWO LIQUID PHASES

Emulsification of the two liquid phases may be accomplished by any of the conventional means, i.e., by simple mixers, homogenizers, colloid mills or by ultrasonic devices. One important factor in the selection of emulsifiers useful in the process is that the energy of mixing imparted to the liquids be sufficient to form disperse phase liquid particles having a weight median particle size of less than 5 microns. It is preferred that the disperse phase weight mean particle size be between 0.5 and 1.0 micron.

Though the actual method of emulsification may be varied widely, it is essential that the emulsion of the two liquids at all times be maintained at a temperature of between 50° C. and the boiling point of the organic solvent in order to prevent the formation of coagulum on the surface of the emulsion. The term "coagulum" as used here refers to macro-sized particles of coagulated disperse phase, which may have the appearance of lumps or sometimes a rag.

SOLVENT REMOVAL

Removal of the solvent in which the wax-polymer mixture is dissolved is accomplished easily by merely heating the emulsion to or near the boiling point of the solvent, which, with the wax and polymer dissolved therein, comprises the disperse phase of the emulsion. Vaporization of the solvent is normally accompanied by boiling of the solvent and the formation of a foam atop the liquid. The foaming has been found to be of no harm and need not be avoided, since no significant amount of coagulum is formed therein. It has been found, however, that in the removal of the solvent it is necessary to avoid sudden pressure surges, i.e., sudden increases in pressure. More specifically, it has been found that pressure surges of greater than about 5 p.s.i. per second result in the formation of excessive amounts of coagulum. Thus, freedom from pressure surges is a critical limitation upon the solvent-removal step of this process.

CONCENTRATION OF THE EMULSION

Depending upon the particle size of the wax-polymer particles which remain dispersed after solvent removal, the wax polymer emulsion of this invention is self-creaming to some extent. That is to say, upon standing for as little as several hours or more, the emulsion separates without further treatment into two emulsions, an upper rich emulsion layer which has a higher concentration of disperse phase and lower poor emulsion layer which has a disperse phase concentration which is less than that of the uncreamed emulsion. Both are, however, stable emulsions. Because of this self-creaming effect, it is therefore not usually necessary to concentrate the emulsions further by, for example centrifugation but only to decant the upper emulsion from the lower.

The quite unexpected ability of the foregoing described wax-copolymer emulsions to enhance the adhesion of polymeric coatings to fibrous substrates in accordance with the method of the invention is illustrated by the following examples.

The properties of the wax-copolymer emulsions were as follows:

TABLE III.—PROPERTIES OF WAX-COPOLYMER EMULSIONS

|  | A | B |
|---|---|---|
| Solids Content, percent wt | 29.1 | 8.3 |
| Wax [1] | 75 | 75 |
| Copolymer [2] | 25 | 25 |
| Emulsifier,[3] percent wt | 2.0 | 0.56 |

[1] 50% wt. 141–143° F. M.P. (ASTM D-87) distillate paraffinic wax; 40% wt. 172–180° F. M.P. (ASTM D-127) bright stock raffinate wax; 10% wt. 183° F. M.Pt. (ASTM D-87) residual paraffinic wax.
[2] 90 percent m. $C_2=:$, I.V. 3.0 (measured in Decalin at 150° C.).
[3] Potassium soap of rosin acid The results of the laminating tests were as follows:

TABLE IV.—ADHESION OF POLYMERID FILMS TO 16 MIL CARTONBOARD PRETREATED WITH WAX-COPOLYMER EMULSION

| Test No. | Application Conditions | | | Coating Equivalent Amount of Emulsion, mil [1] | Relative Adhesion of Film to Board | | |
|---|---|---|---|---|---|---|---|
|  | Temp., °F. | Pressure p.s.i. | Time sec. |  | Treated | Untreated |  |
| Polymeric Film: 70K wax, 30% $C_2=/C_3=$ copolymer, 1 mil: |  |  |  |  |  |  |  |
| 1 | 75 | 1,600 | [2] 30 | 0.5 | None | None | A |
| 2 | 140 | 1,600 | [2] 30 | 0.5 | Very poor | do | A |
| 3 | 194 | 1,600 | [2] 15 | 0.5 | Excellent | do | A |
| 4 | 210 | 550 | 3 | 0.5 | do | do | A |
| 5 | 205 | 550 | 3 | 0.05 | Very good | do | B |
| 6 | 210 | 50 | 1 | 0.05 | do |  | B |
| Polymeric Film: Polyethylene, 1 mil: |  |  |  |  |  |  |  |
| 7 | 215 | 1,100 | 3 | 0.5 | Excellent | None | A |
| 8 | 215 | 550 | 3 | 0.5 | do | do | A |
| 9 | 215 | 550 | 3 | 0.5 | do | do | A |
| Polymeric Film: Polyethylene, 4 mil: |  |  |  |  |  |  |  |
| 10 | 215 | 550 | 3 | 0.5 | do | do | A |
| 11 | 205 | 3,300 | 3 | 0.05 | Poor | do | B |
| 12 | 230 | 330 | 3 | 0.05 | Good | do | B |
| Polymeric Film: Polypropylene, 0.5 mil: |  |  |  |  |  |  |  |
| 13 | 215 | 1,100 | 3 | 0.5 | None |  | A |
| 14 | 375 | 1,250 | 3 | 0.5 | Excellent | None | A |
| 15 | 350 | 550 | 3 | 0.05 | Very good | do | B |
| Polymeric Film: Polypropylene, 7 mil: |  |  |  |  |  |  |  |
| 16 | 365 | 1,250 | 3 | 0.5 | Excellent | do | A |
| 17 | 365 | 500 | 3 | 0.5 | do | do | A |
| 18 | 360 | 250 | 3 | 0.05 | Good | Very poor | B |

[1] Calculated from the amount of emulsion pick-up solids content, superficial surface area of the paperboard and density of wax polymer mixture.
[2] Emulsion-treated board previoulsy heated to 90° C. (194° F.).

Example I

A large number of samples of paperboard were treated with a wax-ethylene propylene copolymer aqueous emulsion by dipping the paperboard into the emulsion at room temperature, i.e., at about 70° F. (20° C.). Each of the emulsion-treated boards was dried. Each of the treated boards, as well as a number of like untreated paperboard samples for control, were laminated with an extruded polymeric film by means of a heated press. As indicated in the results of the experiment, three treated boards were also heated to 90° C. (194° F.) prior to laminating to observe the effect of consolidation of the emulsion coating on improved adhesion.

Three different types of film were employed: wax/ethylene-propylene copolymer, polyethylene and polypropylene. In addition, parameters of laminating time, temperature and pressure were also observed. The degree of adhesion of each of the test samples was determined by placing firmly on the laminated surface a piece of transparent pressure-sensitive tape, such as that which is marketed under the trademark Scotch tape, and then rapidly stripping the tape from the laminated film surface. The degree of adhesion is rated by the appearance of the remaining board. If the board is smooth, there was essentially no adhesion. If the fibers of the board were torn off with the lamination, the adhesion was good to excellent, depending on the size of the area of torn fibers from the substrate.

The over-all results indicate that definitely improved adhesion of polymeric films to fibrous substrates is obtained by pretreatment of the substrate with wax/ethylene-propylene copolymer emulsion. Tests Nos. 1–3, in which the substrate had been heat-treated at 194° F. prior to lamination, show that consolidation of the emulsion coating prior to lamination is not only unnecessary, but will not give improved adhesion if the temperature at which the lamination is applied is too low, i.e., below about the melting point of the laminating film material.

Further comparison, for example, of tests 2 with 3, 10 with 11, and 13 with 14 shows that the minimum temperature at which the laminating coat can be applied and obtain improved adhesion, as a result of the wax-copolymer emulsion pretreatment, is at least approximately the melting point of the laminating film, which in this case were about 194, 215 and 350° F. respectively for the wax-copolymer, polyethylene and polypropylene respectively. It is an interesting aspect of this invention, as shown by these results, that the critical laminating temperature should be so low, since the viscosity of such polymeric coatings at around their melting point is quite high and thus only a small amount of penetration into the fibrous structure would be expected. Moreover, the data also show quite unexpectedly that no significant improvement in adhesion is obtained by application of the laminating film at temperatures above about the melting point of the film.

Since the previous series of tests was performed on individual pressed films, a further series of tests was performed to confirm that the previously observed effects of improved adhesion, arising from the surface treatment in accordance with the invention, would also be found when the film was continuously extruded from a hot melt as in most commercial applications of such films.

Example II

A series of tests was performed using strips of cartonboard which had been emulsion-treated in accordance with the invention. The long strips of cartonboard were treated with emulsion by continuous dip coating at a speed of 30 inches per minute in an unheated tank containing the emulsion and the water of emulsion removed substantially by passing the treated strips between two streams of hot air so that the treated board attained the matte finish typical of coated paper. The emulsion-treated strips were then passed through a continuous extrusion coater in which a continuous polymeric film was laminated to the emulsion-treated board. Some of the treated board strips were preheated before extrusion to observe the effect thereof. The results were as follows:

treated with latex to an equivalent film thickness of 0.05 mil. Since it is generally thought that the adhesion of extruded polyethylene to paper is a consequence of the oxidative degradation of the polymer during extrusion with the accompanying possibility of odor, it is significant that such good adhesion with polyethylene is obtained at reduced temperature.

A still further series of tests was performed to observe the benefits of wax-copolymer emulsion pretreatment on the continuous extrusion coating of substrates with polypropylene film.

Example III

Several strips of 6½ inches wide cartonboard were preheated with a wax-ethylene propylene copolymer (EPC) emulsion containing 23% wt. solids. The resultant coating was equivalent to a thickness of about ¼ mil of solids per side. Part of the boards were dried at 90° C. while the remainder were dried at ambient temperature (ca. 20° C.). The thusly pretreated boards, as well as a number of untreated boards for control were then laminated with a film of polypropylene by means of a continuous extrusion coater. As in Example II, the effect of preheating the

TABLE V.—ADHESION OF EXTRUDED POLYMER FILMS TO 16 MIL PAPERBOARD

| Laminating Film | Extrusion Conditions [1] | | Emulsion Pretreatment, Equivalent Thickness, mils | Adhesion [3] |
|---|---|---|---|---|
| | Die Temp., °F. | Preheat [2] | | |
| Wax/Ethylene-Propylene Copolymer. | 450 | No | 0 | 0 |
| | | No | 0.05 | 3 |
| | | No | 0.5 | 3 |
| | | Yes | 0 | 1 |
| | | Yes | 0.05 | 3 |
| | | Yes | 0.5 | 3 |
| | | No | 0 | 0 |
| | | Yes | 0 | 0 |
| | 500 | No | 0 | 0 |
| | | No | 0.05 | 3 |
| | | No | 0.5 | 3 |
| | | Yes | 0 | 1 |
| | | Yes | 0.05 | 3 |
| | | Yes | 0.5 | 3 |
| | 500 | No | 0 | >0 |
| | | No | 0.5 | 3 |
| | | Yes | 0 | 0 |
| | | Yes | 0.5 | 3 |
| | 550 | No | 0 | 0 |
| | | No | 0.05 | 3 |
| | | No | 0.5 | 3 |
| | | Yes | 0 | 1 |
| | | Yes | 0.05 | 3 |
| Polyethylene | 550 | Yes | 0 | 0 |
| | | Yes | 0.05 | 2 |
| | | Yes | 0.5 | 3 |
| | 650 | No | 0 | 3 |
| | | No | 0.05 | 3 |
| | | No | 0.5 | 3 |

[1] Paper speed 160 ft./min., 80 p.s.i. laminating roll pressure, thickness of extruded film average about 1 mil.
[2] Board is preheated before lamination by means of electric heaters and/or infrared lamps.
[3] Based on rapidly ripping pressure-sensitive tape from board—0=no adhesion, remaining board surface smooth; 1=remaining board surface rough, torn area about same as taped area; 2=torn area appreciably greater than taped area; 3=complete fiber tear in taped area and considerably in excess of taped area.

The foregoing results indicate clearly that an emulsion pretreatment of at least as low as 0.05 mil will greatly increase the adhesion of extruded polymeric coatings. The preheating available in these experiments alone improved the adhesion, although not to a level equal to that obtained with precoat. The surface temperature of the preheat boards in these experiments was not high enough to fuse the emulsion particles of the precoat. Within the limits of the criterion for adhesion used here, there was no difference among boards with fused and unfused precoats. The increased adhesion resulting from the emulsion precoat is apparent also at reduced die temperatures in the extruder. Since the viscosity of the molten wax-polymer mixture at the die is an important parameter for determining the extrusion characteristics, a further benefit attendant with the use of emulsion pretreatment is the possible reduction in die temperature. The influence of the emulsion pretreatment on the adhesion of polyethylene is not apparent at 650° F., since at this temperature the adhesion to untreated board is good. However, at 550° F. a definite improvement is evident for cartonboard preboard before passing to the extrusion die was observed. The results were as follows:

TABLE VI.—ADHESION OF POLYPROPYLENE TO 16 MIL PAPERBOARD PRETREATED WITH WAX-EPC EMULSION

[Extruder speed, 200 ft./min. Film thickness, nominal, 1.5 mils]

Substrate treatment:      Peel strength, grams/inch
  None:
    Without preheat _____ 127
    With preheat _____ 53
  Emulsion treat, dried at ambient temperature:
    Without preheat _____ 89
    With preheat _____ 207
  Emulsion treat, dried at 90° C.:
    Without preheat _____ 215
    With preheat _____ 243

Again, it is observed that the pretreatment results in a substantial increase in adhesion of the polymeric film to the substrate. In addition, it is also evident that high-temperature drying of the pretreated board still further increases the adhesion of the polymeric film. A drying temperature of 75–100° C. is preferred.

Of particular interest is the fact that preheating the substrate prior to extrusion is of substantial benefit in improving adhesion of the film to the pretreated substrate while it was distinctly harmful to the adhesion of the film to the substrates which had not be pretreated in accordance with the invention.

Though in the foregoing examples a non-polar ethylene–alpha-olefin copolymer was used in the emulsion pretreatment of the substrate, ethylene copolymers of polar comonomers such as vinyl acetate or ethyl acrylate are likewise suitable as is illustrated by the following example.

Example IV

TABLE VII.—PROPERTIES OF WAX-COPOLYMER EMULSIONS

|  | A | B |
|---|---|---|
| Solids Content, percent wt | 15.4 | 7.7 |
| Wax [1] | 74 | 74 |
| Copolymer [2] | 26 | 26 |
| Emulsifier,[3] percent wt | 2.0 | 1.0 |

[1] 141–143° F. M.Pt (ASTM D-87) distillate paraffinic wax.
[2] Ethylene-vinyl acetate copolymer (see polymer F, Table I).
[3] Potassium soap of rosin acid.

The above-noted emulsions were used to treat 16 mil cartonboard and tested in the manner of Example I. The results were as follows:

TABLE VIII.—ADHESION OF POLYMERIC FILMS TO 16 MIL CARTONBOARD PRETREATED WITH WAX-COPOLYMER EMULSION

| Test No. | Emulsion Drying Temp., °C. | Application Conditions | | | Coating Equivalent Amount of Emulsion, mil [1] | Relative Adhesion of Film to Board [2] | |
|---|---|---|---|---|---|---|---|
| | | Temp., °F. | Pressure, p.s.i. | Time, sec. | | Treated | Untreated |
| Polymeric Film: 70N wax, 30N $C_2^-/C_3^-$ copolymer: | | | | | | | |
| 19 | 90 | 215 | 280 | 3 | 0.3 | Excellent | Very poor. |
| 20 | 25 | 195 | 280 | 3 | 0.16 | do | None. |
| 21 | 90 | 195 | 280 | 3 | 0.16 | do | Poor. |
| Polymeric Film: Polyethylene: | | | | | | | |
| 22 | 25 | 215 | 280 | 3 | 0.3 | do | None. |
| 23 | 90 | 215 | 280 | 3 | 0.3 | do | Do. |
| 24 | 25 | 215 | 280 | 3 | 0.16 | Very good | Do. |
| 25 | 90 | 215 | 200 | 3 | 0.16 | Excellent | Do. |
| Polymeric Film: Polypropylene: | | | | | | | |
| 26 | 25 | 365 | 280 | 3 | 0.3 | do | Do. |
| 27 | 90 | 365 | 280 | 3 | 0.3 | do | Do. |
| 28 | 25 | 365 | 280 | 3 | 0.16 | do | Do. |
| 29 | 90 | 365 | 280 | 3 | 0.16 | do | Do. |

[1] Obtained from solids content, emulsion pickup, superficial area of paperboard and density of wax-polymer coating.
[2] Determined by pressure-sensitive tape test described in Example I.

I claim as my invention:

1. A method of improving the adhesion of polymeric films to fibrous substrates comprising the steps of (1) treating at least one surface of the fibrous substrate with an aqueous emulsion, the dispersed phase of which consists of particles of a mixture of 40–95% by weight of petroleum wax and 5–60% by weight of a copolymer of ethylene and a $C_{3-5}$ comonomer selected from the group consisting of alpha-olefins, esters of terminally ethylenically unsaturated carboxylic acids and saturated aliphatic alcohols and esters of saturated monocarboxylic acids and terminally ethylenically unsaturated aliphatic alcohols, (2) removing the water of emulsion from the treated substrate by drying said substrate at a temperature of at least 75–100° C., and (3) laminating a polymeric film to at least one treated substrate surface at a temperature at least about as high as the melting point of the polymeric film.

2. The method of claim 1 in which the polymeric film is a mixture of wax and polymer.

3. The method of claim 1 in which the polymeric film is polyethylene.

4. The method of claim 2 in which the polymeric film is a mixture of wax and a copolymer of ethylene and a $C_{3-5}$ comonomer selected from the group consisting of alpha-olefins, esters of terminally ethylenically unsaturated carboxylic acids and saturated aliphatic alcohols and esters of saturated monocarboxylic acids and terminally ethylenically unsaturated aliphatic alcohols.

5. The method of claim 1 in which the polymeric film is polypropylene.

References Cited

UNITED STATES PATENTS

| 3,172,801 | 3/1965 | Cantelow | 161—216 |
| 3,210,305 | 10/1965 | Coenen et al. | 260—28.5 |
| 3,303,082 | 2/1967 | Wilson | 156—324 |
| 3,312,564 | 4/1967 | Barbour | 260—28.5 |

ROBERT F. BURNETT, *Primary Examiner.*

MORRIS SUSSMAN, *Examiner.*

W. J. VAN BALEN, *Assistant Examiner.*